United States Patent [19]
Schneider et al.

[11] 3,846,379
[45] Nov. 5, 1974

[54] POLYAMIDE SHOCK ABSORBER PISTON FROM TEREPHTHALIC ACID AND BRANCHED DIAMINE

[75] Inventors: Johannes Schneider; Wolfgang Pungs, both of Troisdorf, Germany

[73] Assignee: Dynamit Nobel Aktiengesellschaft, Troisdorf, Germany

[22] Filed: July 6, 1971

[21] Appl. No.: 160,120

[30] Foreign Application Priority Data
July 4, 1970  Germany............................ 2033193

[52] U.S. Cl.......... 260/78 S, 260/33.4 R, 260/78 R, 264/234
[51] Int. Cl............................................. C08g 20/38
[58] Field of Search.......................... 260/78 R, 78 S

[56] References Cited
UNITED STATES PATENTS

| | | | |
|---|---|---|---|
| 2,130,948 | 9/1938 | Carothers........................... | 260/78 R |
| 2,516,585 | 7/1950 | Pease et al......................... | 260/78 R |
| 2,585,163 | 2/1952 | Pease et al......................... | 260/78 R |
| 2,600,843 | 6/1952 | Bush................................... | 267/1 |
| 3,150,113 | 9/1964 | Gabler................................ | 260/78 R |
| 3,150,117 | 9/1964 | Gabler................................ | 260/78 R |
| 3,198,771 | 8/1965 | Gabler................................ | 260/78 R |
| 3,294,758 | 12/1966 | Gabler................................ | 260/78 R |
| 3,393,210 | 7/1968 | Speck.................................. | 260/78 R |
| 3,416,302 | 12/1968 | Knospe............................... | 260/78 R |
| 3,449,299 | 9/1969 | Schreider et al.................. | 260/78 R |
| 3,454,536 | 7/1969 | Schade et al...................... | 260/78 R |
| 3,728,312 | 4/1973 | Schneider et al. ................ | 260/78 R |
| 3,728,312 | 4/1973 | Schneider......................... | 260/78 R |

OTHER PUBLICATIONS

Chemical Abstsracts, Vol. 58, 6459g, (1963).
Polyamide Resin – Floyd, Second Edition, (1966), p. 157.

*Primary Examiner*—Harold D. Anderson
*Attorney, Agent, or Firm*—Craig & Antonelli

[57] ABSTRACT

A shock absorber piston especially suitable for use in automobiles and like vehicles wherein the piston is in contact with a damping fluid and is subject to repeated stresses under varying degrees of pressure and temperature; the piston is made of an amorphous polyamide characterized by a viscosity of about 100 to 200 in a 0.5 percent by weight solution in m-cresol at 25°C.

4 Claims, No Drawings

POLYAMIDE SHOCK ABSORBER PISTON FROM TEREPHTHALIC ACID AND BRANCHED DIAMINE

This invention relates to shock absorber pistons which are guided displaceably in a cylinder and are attached to a piston rod in a damping fluid, e.g., a hydraulic liquid, so that the cylinder is subdivided into two operating or working chambers of varying volume, and which are produced from a thermoplastic material having a polyamide base. Shock absorber pistons are utilized as a damper element in industry, predominantly in the automobile industry. Heretofore, these pistons have been manufactured mainly of metals. However, this conventional material is, in most cases, far from satisfactory for meeting the heterogeneous requirements found in practice.

In addition to the chemical stability and the indifference or inertness of the shock absorber material with respect to the damping fluid, the following properties are desirable: (1) easy handling due to low specific gravity of the material, (2) economical manufacture, (3) corrosion resistance, (4) a dense, smooth surface on the material, (5) favorable sliding properties, (6) high pressure resistance and rigidity, and (7) good dimensional stability at varying temperatures.

Many of these properties are provided in synthetic resins. Therefore, there have been many attempts to introduce shock absorber pistons made of various polymers to industry. However, a satisfactory solution, heretofore, has been impossible for the reason that no synthetic resin or polymer was found which fulfills all above-mentioned requirements in their entirety and which can be handled easily during the processing thereof so that even complicated shock absorber pistons with ribs and perforations can be readily manufactured without any secondary treatment, e.g., refinishing.

Fluorinated or fluorochlorinated high-molecular hydrocarbons and chlorosulfonated polyethylene do exhibit a high chemical resistance, but are too soft and are unsuitable for use in making such pistons. Shock absorbers made of thermosets, i.e., thermosetting resins, fulfill the requirements of thermal dimensional stability according to Martens, but are extremely sensitive to breakage and impacts and thus do not meet the requirements in practical operation.

Polyolefins, such as polyethylenes or cross-linked polyethylenes, polypropylenes and poly-4-methylpentene satisfy a number of requirements, but exhibit the disadvantage of a pronounced tendency to flow under pressure and temperature stresses. In case of pistons having larger dimensions, the required structural rigidity is likewise absent in polyolefins, due to the lower modulus of elasticity. Besides, shaped articles of polyolefins tend to warp under temperature stress, due to the high coefficients of thermal expansion.

With the use of partially crystallizing polyamides, brittleness phenomena are observed at the temperatures of about 100°C. which often occur in practice. Also, the low dimensional stability under temperature stress is found to be a disadvantage.

Polyvinyl chloride exhibits a good chemical resistance, but cannot be employed at temperatures of above 80°C. due to its low dimensional stability at high temperatures. Polyacetals have a high pressure resistance and good abrasion resistance, but tend to exhibit undesired warping phenomena due to shrinkage with age.

Polymers, such as, for example, polycarbonates, polyphenylene oxide, and polysulfone satisfy the requirements regarding temperature stability and pressure resistance. However, with regard to abrasion resistance and resistance to chemicals, these polymers exhibit disadvantages, so that they cannot meet the requirements in industrial practice.

The present invention, accordingly, relates to a shock absorber piston made from a synthetic resin which satisfies all the conditions to be fulfilled in practice particularly in the automotive industry.

Thus, this invention contemplates shock absorber pistons which are characterized in that the pistons are produced from amorphous polyamides which contain residues of aliphatic, straight-chain or branched diamines or aromatic diamines and residues of aliphatic or aromatic dicarboxylic acids, and which exhibit a viscosity of about 100 to about 200, preferably about 124 to about 150.

Examples for suitable diamine components for the manufacture of the polyamides of this invention are hexamethylenediamine; nona-, deca-, or dodecamethylenediamine; and furthermore alkyl-substituted diamines, such as 2-methyl-4-ethylhexamethylenediamine; 2,2,5,5-tetramethylhexamethylenediamine; 3-isopropylhexamethylenediamine; 3-isooctylhexamethylenediamine; 3-isododecylhexamethylenediamine; 2,4-diethyloctamethylenediamine; 2,2,4-trimethylhexamethylenediamine; 2,4,4-trimethylhexamethylenediamine; or also cyclic diamines, such as 2-aminomethyl-3,5,5-trimethylcyclohexylamine; or furthermore aromatic diamines, such as phenylenediamine and xylylenediamine. Additionally suitable are diamines of the general formula:

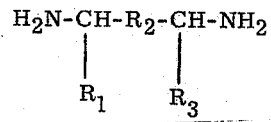

wherein
- $R_1$ represents hydrogen or an alkyl group of 1–4 carbon atoms, $R_2$ represents an unsubstituted or alkyl-substituted alkylene group of 1–10 carbon atoms in the chain, or an unsubstituted or alkyl-substituted phenylene residue (the alkyl groups having 1–4 carbon atoms), and $R_3$ represents an alkyl group of 1–4 carbon atoms. Exemplary diamines represented by this formula are, for example, 1,3-diaminobutane; 2,5-diamino-3,4-dimethylhexane; 1,5-diamino-4-isopropylhexane; 2,7-diamino-4-methyloctane; 3,5-diaminoheptane; 1,7-diamino-4,4-dimethyloctane; 1,7-diamino-4,4,6-trimethyloctane; 1,7-diamino-4,4,8-trimethylnonane; or $\alpha, \alpha'$-diamino-1,3-diethylbenzene.

Suitable dicarboxylic acid components for the production of the polyamides can be, for example, aliphatic dicarboxylic acids, such as adipic or sebacic acid, particularly in conjunction with hexamethylenediamine and p,p'-diaminocyclohexylpropane or -methane, and aromatic dicarboxylic acids, such as terephthalic acid, isophthalic acid, or naphthalene dicarboxylic acid.

The polyamides are to exhibit a viscosity of about 100 to about 200, preferably about 124 to about 150, wherein the measurement of the viscosity number is conducted in accordance with the German Industry Standard testing procedure designated as DIN 53727 in a 0.5 percent by weight solution in m-cresol at 25°C.

These polyamides can be prepared basically in accordance with all processes customary for the production of conventional polyamides containing dicarboxylic acid and diamine residues. Thus, it is possible, for example, to polycondense the aqueous, concentrated solution of the salt of a dicarboxylic acid and a diamine in the melt, first under pressure and then under expansion at an elevated temperature. In this connection, it is also possible to circumvent the pressure stage by subjecting the salt to a preliminary condensation in high-boiling solvents, and apply a vacuum in the last stage of the polycondensation.

It is also feasible to react lower alkyl esters of the dicarboxylic acids with practically equimolar amounts of diamine in the presence of water and to polycondense the product like an aqueous salt solution. Instead of starting with lower alkyl esters, the starting compounds can also be diaryl esters of the dicarboxylic acids, and in this case the concomitant use of water can be eliminated. As for the above-mentioned polyamides and/or the preparation thereof, note, for example, U.S. Pat. No. 3,150,117; British Pat. No. 1,049,987; and Belgain Pat. No. 723,154.

pistons according to the present invention exhibit, upon storage for a longer period of time, practically no dimensional changes. No deformation or destruction under practical conditions was observed. Just as favorable is the minor and constant process shrinkage, so that the manufacture of complicated and finely structured shock absorber pistons is very easily possible.

The transparent shock absorber pistons of this invention exhibit a smooth and non-porous surface and can be manufactured on commercial-type injection molding machines. The transparent polyamides used for the manufacturing process can, of course, be mixed with coloring agents, e.g., pigments, so that an opaque or transparent coloring of the shock absorber pistons is made possible.

In the following table, several properties are listed of a number of polyamides on the basis of aromatic dicarboxylic acids usable according to this invention for the manufacture of shock absorber pistons, and measured in accordance with German Industrial Standards (DIN).

TABLE 1

| Test Procedure According to DIN | | | Polyamides From | | |
|---|---|---|---|---|---|
| | | | Terephthalic Acid + 1,7-Diamino-4,4-dimethyloctane | Dimethyl Terephthalate + 2,2,4-/2,4,4-Trimethyl-hexamethylenediamine | Dimethyl Terephthalate + 70% 2,2,4-/2,4,4-Trimethylhexamethylenediamine + 30% hexamethylenediamine |
| Viscosity[1] | | 53 727 | 124 | 140 | 150 |
| Density | g./cm$^3$ | 53 479 | 1.09 | 1.12 | 1.14 |
| Critical modulus of rupture upon flexing | kp/cm$^2$ | 53 452 | 1090 | 1250 | 1140 |
| Tensile strength | kp/cm$^2$ | 53 455 | 830 | 850 | 815 |
| Impact strength | kp · cm/cm$^2$ | 53 453 | n.g.[2] | n.g. | n.g. |
| Ball indentation hardness | kp/cm$^2$ | 53 456 | 1400 | 1400 | 1400 |
| Linear coefficient of thermal expansion | l/degree C. | | $61 \cdot 10^{-6}$ | $60 \cdot 10^{-6}$ | $60 \cdot 10^{-6}$ |
| Heat distortion stability according to Martens | degrees C. | 53 458 | 108 | 100 | 101 |
| Process shrinkage | percent | | 0.6 | 0.5 | 0.5 |

[1] Viscosity in a 0.5% by weight solution in m-cresol at 25°C.
[2] No failure

The aforementioned polyamides can be processed to transparent shaped articles in an injection molding, extrusion, and press molding process. In order to avoid undesired effects during processing, such as, for example, the formation of streaks in and/or on the shaped article, it proved to be particularly advantageous to condition the abovementioned polyamides in the form of chips or granules for about 14 hours at a temperature in the range of 110°-150°C., preferably 140°C., in an inert gas atmosphere, e.g., nitrogen, carbon dioxide, argon, helium, or the like, under a vacuum, e.g., from 700 to 10 mm Hg.

Shock absorber pistons can be readily manufactured from the above-disclosed amorphous polyamides, after carrying out the conditioning step, by means of the injection molding process. They excel in their high resistance against aliphatic and aromatic hydrocarbons, against mineral oils, as well as against acids and alkalis. The mechanical strength and the heat distortion stability according to Martens (DIN 53458) are very good. The thermal coefficient of expansion is small, and the abrasion resistance and the pressure resistance correspond to practical requirements. The shock absorber The properties of polyamides of adipic acid or sebacic acid, hexamethylenediamine or p,p'-diaminocyclohexylpropane or p,p-diaminocyclohexylmethane, and caprolactam are approximately on the following order of magnitude:

TABLE 2

| | | Test Procedure According to DIN | |
|---|---|---|---|
| Viscosity | | 53 727 | 172 |
| Density | g./cm$^3$ | 53 479 | 1.07 |
| Critical modulus of rupture upon flexing | kp/cm$^2$ | 53 452 | 1300 |
| Tensile strength | kp/cm$^2$ | 53 455 | 800 |
| Impact strength | kp · cm/cm$^2$ | 53 453 | n.g. |
| Ball indentation hardness | kp/cm$^2$ | 53 446 | 1400 |
| Lineary coefficient of thermal expansion | l/degree C. | | $60 \cdot 10^{-6}$ |
| Heat distortion stability according to Martens | degrees C. | 53 458 | 95–100 |
| Process shrinkage | percent | | 0.4 |

Examples for the production of shock absorber pistons from the aforementioned polyamides, after the conditioning procedure has been effected, are set forth below.

EXAMPLE 1

On a commercial screw-type injection molding machine, consisting of an injection unit, a nozzle, and a mold, chips of amorphous polyamide from the dimethyl ester of terephthalic acid and a mixture of 2,2,4- and 2,4,4-trimethylhexamethylenediamine are processed after having been conditioned beforehand, i.e., at 140°C. in a nitrogen atmosphere. The polyamide exhibited a viscosity number of 140 and was processed in the screw cylinder at temperatures of 240°–320°C., preferably 260°–305°C., into transparent shock absorber pistons. The injection molding pressure was about 200 kp/cm$^2$, the mold temperature was 90°C. The total cycle of the process was 40 seconds. Since the shock absorber pistons exhibit a high strength immediately upon removal from the mold, they are directly suitable for the subsequent assembly operation.

EXAMPLE 2

Granules of an amorphous polyamide from terephthalic acid and 1,7-diamino-4,4-dimethyloctane with a viscosity number of 100 were conditioned and processed into transparent shock absorber pistons by means of an injection molding unit as set forth in Example 1. The processing temperatures in the screw cylinder were 250°–310°C., preferably 270°–295°C. The injection was rapidly effected at an injection pressure of 300 kp/cm$^2$. Removal of the pistons from the mold was conducted at about 85°C.

EXAMPLE 3

The shock absorber pistons manufactured by the procedures outlined in Examples 1 and 2 and pistons produced by other suitable polyamides having a viscosity of 100–200 were evaluated by DIN testing procedures and found to have — a specific gravity in the range of from 1.09 to 1.14 g./cm$^3$; a tensile strength from 750 to 850 kp/cm$^2$; an impact strength of no failure according to DIN 53453; a hardness of about 1400 kp/cm$^2$; a linear coefficient of thermal expansion of about 60·10$^{-6}$ 1°C.; a heat distortion stability according to Martens of from 95° to 120°C.; a process shrinkage of from 0.4 to 0.6 percent; and a critical modulus of rupture upon flexing of 1000 to 1250 kp/cm$^2$. This combination of properties and the corrosion resistance of these polyamides has been found to be especially suitable for producing shock absorber pistons which satisfy the demand of the automotive industry.

What we claim is:

1. A shock absorber piston, adapted to be guided in a cylinder containing a damping fluid and to be attached to a piston rod, said piston being produced from amorphous polyamide consisting essentially of the polymeric condensation product of the dimethyl ester of terephthalic acid and a mixture of 2,2,4- and 2,4,4-trimethylhexamethylenediamine, said polyamide exhibiting a viscosity of about 100 to about 200 measured in a 0.5 percent by weight solution in m-cresol at 25°C. and prior to the formation of said piston having been conditioned for 8 to 16 hours at a temperature from about 110°C. to about 150°C. in an inert gas atmosphere under vacuum.

2. A shock absorber piston, adapted to be guided in a cylinder containing a damping fluid and to be attached to a piston rod, said piston being produced from amorphous polyamide consisting essentially of the polymeric condensation product of residues of an aliphatic branched diamine or mixtures thereof and residues of an aromatic dicarboxylic acid, said polyamide exhibiting a viscosity of about 100 to 200 measured in a 0.5 percent by weight solution in m-cresol at 25°C. and prior to formation of said piston having been conditioned for 8 to 16 hours at a temperature of about 110°C. in an inert gas atmosphere under vacuum.

3. The shock absorber piston of claim 2 in which the amorphous polyamide is produced, with respect to the acid residues, from terephthalic acid; and, with respect to the diamine residues, from a diamine selected from the group consisting of 2,2,4-trimethylhexamethylenediamine; 2,4,4-trimethylhexamethylenediamine; and 1,7-diamino-4,4-dimethyloctane.

4. The shock absorber piston of claim 2 in which the amorphous polyamide is produced from the dimethyl ester of terephthalic acid and from the mixture of diamines of 2,2,4- and 2,4,4-trimethylhexamethylenediamine, or up to about 30 percent of the diamine mixture replaced by hexamethylenediamine.

* * * * *